United States Patent
Ohkado

(10) Patent No.: US 7,020,391 B2
(45) Date of Patent: *Mar. 28, 2006

(54) SENSOR DEVICE

(75) Inventor: Teruyuki Ohkado, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/915,198

(22) Filed: Aug. 10, 2004

(65) Prior Publication Data

US 2005/0008356 A1    Jan. 13, 2005

Related U.S. Application Data

(62) Division of application No. 10/298,736, filed on Nov. 18, 2002, now Pat. No. 6,791,672.

(30) Foreign Application Priority Data

Nov. 30, 2001  (JP) .............................. 2001-366254

(51) Int. Cl.
*G01C 3/08* (2006.01)
*G03B 7/99* (2006.01)

(52) U.S. Cl. .................. 396/111; 396/234; 396/268; 356/3.14

(58) Field of Classification Search ............... 396/111, 396/114, 233, 234; 356/3.08, 3.14
See application file for complete search history.

(56) References Cited

U.S. PATENT DOCUMENTS

| 5,302,997 | A  * | 4/1994  | Cocca .......................... 396/99 |
| 6,642,998 | B1 * | 11/2003 | Nakagawa .................. 356/3.14 |
| 6,785,468 | B1 * | 8/2004  | Takasaki et al. ............. 396/111 |
| 6,791,672 | B1 * | 9/2004  | Ohkado ...................... 356/3.13 |
| 6,803,614 | B1 * | 10/2004 | Takahashi ................... 257/292 |

FOREIGN PATENT DOCUMENTS

JP    09-329818    12/1997

* cited by examiner

*Primary Examiner*—W. B. Perkey
(74) *Attorney, Agent, or Firm*—Cowan, Liebowitz & Latman, P.C.

(57) ABSTRACT

A camera is disclosed which is provided with a sensor device that includes: a substrate having formed thereon which first and second line sensors that are arranged a fixed baseline length apart from each other and a third sensor for receiving light from a field which is arranged on a line in arrangement direction of the first and second line sensors, a first light receiving optical unit for condensing light from the field onto the first line sensor, a second light receiving optical unit for condensing light from the field onto the second line sensor, a third light receiving optical unit for condensing light from the field onto the third sensor, wherein, when focal lengths of the first, second, and third light receiving optical units are assumed to be f1, f2, and f3, respectively, the following condition is satisfied: $f1=f2 \geq f3$.

4 Claims, 8 Drawing Sheets

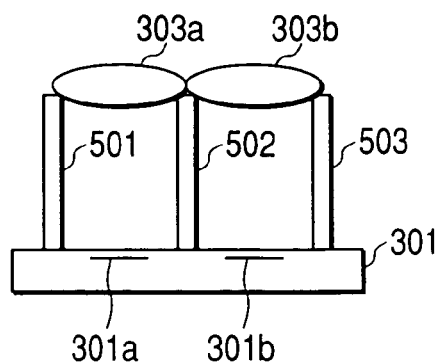
FIG. 9A
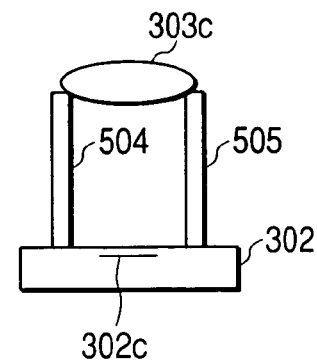
FIG. 9B
FIG. 10
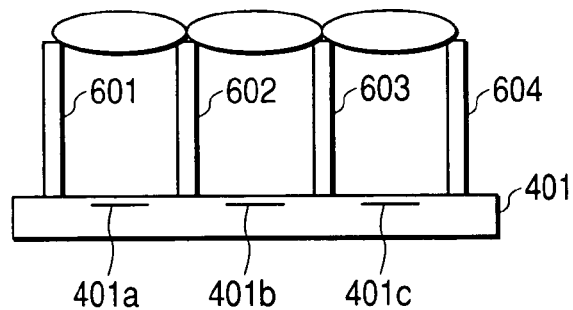
FIG. 11
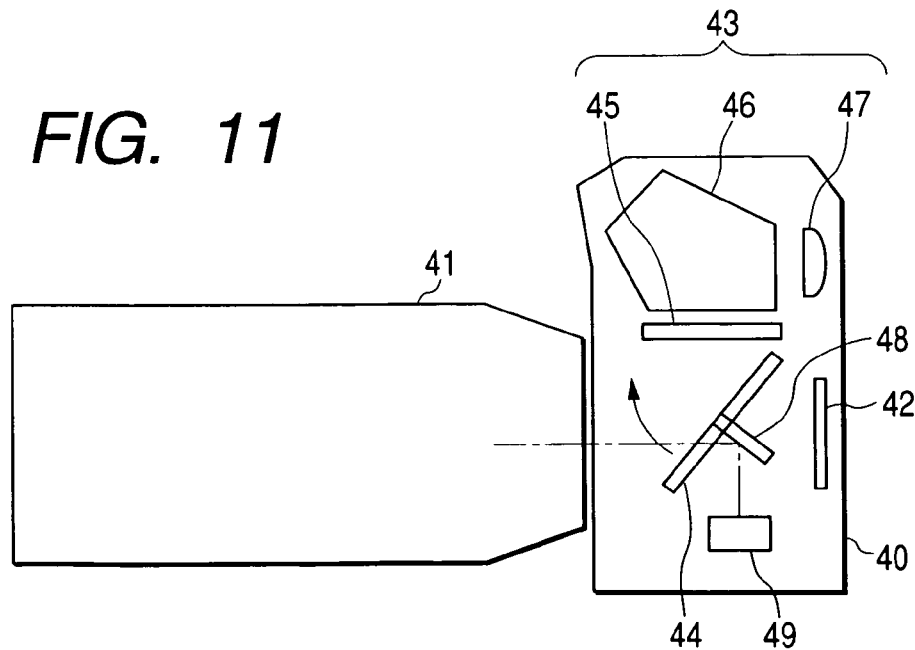

SENSOR DEVICE

CROSS-REFERENCE TO RELATED APPLICATIONS

This application is a divisional of application Ser. No. 10/298,736, filed Nov. 18, 2002, now U.S. Pat. No. 6,791,672, the entire disclosure of which is hereby incorporated by reference.

BACKGROUND OF THE INVENTION

1. Field of the Invention

The present invention relates to a sensor device and an optical apparatus having the same. In particular, the present invention is preferable for optical apparatuses such as a digital camera, a video camera and a film camera that have a range finding sensor for receiving light from a field to measure a distance to an object existing in the field and a photometric sensor for receiving light from a field to measure luminance of the field and can perform range finding and photometry with high accuracy.

2. Related Background Art

Up to now, a range finder is well known which measures a distance to a subject in an optical apparatus such as a camera. For example, a range finder is well known which, passes light from a subject through two optical systems arranged at a fixed distance to form a part of subject images on separate two line sensors and measures a distance to the subject by finding a correlation between the two subject images from output signals from the two line sensors.

In addition, a photometer is also well known which measures luminance (brightness) of a subject in an optical apparatus such as a camera. For example, the photometer passes light from a field through an optical system to cause an area sensor to receive the light, measures field luminance according to an intensity of an output signal of the area sensor, and uses the field luminance for exposure control of the optical apparatus. Various photometers such as a camera have been proposed which are devised so as to segment a sensor used in measurement of field luminance into a plurality of sensors to detect a difference of luminance in a main subject to be photographed and its background and, if the difference of luminance is equal to or larger than a predetermined amount, causes a strobe to emit light judging that the main subject is in a back light state, thereby making an exposure state of the main subject adequate.

Independent separate sensors and optical systems are generally used as a line sensor and an optical system thereof used in the range finder and an area sensor and an optical system thereof used in the photometer. Therefore, if both the range finder and the photometer are mounted on a camera or the like, separate spaces for arranging each of them are required, which becomes a restriction on design of the camera or the like and, at the same time, leads to increase in a size of the camera or the like. In addition, when an interval between the range finder and the photometer is large, parallax of a range finding center and a photometric center occurs. Thus, for example, even if the range finding center catches a main subject depending on a distance to a subject, the photometric center catches the background, which may result in a case in which a photographed picture (image) is focused but has inadequate exposure.

In order to solve the above-mentioned problem, it has been proposed to integrate a range finder and a photometer in U.S. Pat. No. 5,302,997, Japanese Patent Application Laid-Open No. 09-329818 and the like. In these proposals, a pair of line sensors for range finding are arranged a fixed baseline length apart from each other, and an area sensor for photometry is arranged in a position between the pair of line sensors. Moreover, both the sensors are formed on one substrate (chip) and, at the same time, an optical system corresponding to each sensor is provided.

These proposals have an advantage in that, since it is sufficient to prepare only a space for the above-mentioned integrated device in a camera or the like, restriction on design is eliminated and, at the same time, since an interval between the range finder and the photometer is significantly reduced, the problem of parallax of the range finding center and the photometric center can be controlled to minimum.

U.S. Pat. No. 5,302,997 and Japanese Patent Application Laid-Open No. 09-329818 describe a structure as a sensor to some extent. However, there are no detailed descriptions concerning a structure as a device including an optical system and a case in which the device is incorporated in an optical apparatus such as a camera. Thus, there are following problems in materializing the inventions as products:

(i) If the range finder and the photometer are separately constituted, the sensors are also separate chips as shown in FIGS. 7A and 7B. A size of a chip 301 of range finding sensors 301a and 301b generally depends on a size of the range finding sensors. A size of a chip 302 for a photometric sensor 302c generally depends on a size of the photometric sensor. Thus, each sensor chip is efficient and is relatively excellent in terms of chip costs.

On the other hand, when the respective sensors are integrated into one chip as shown in FIG. 8, a size of a sensor chip 410 in a vertical direction in the figure depends on a dimension of a photometric sensor 401c. In addition, a size of the sensor chip 410 in a horizontal direction in the figure depends on a dimension of range finding sensors 401a and 401b and a dimension of a photometric sensor 401c. As is seen from FIG. 8, there are dead spaces above and below the range finding sensors 401a and 401b. Thus, the sensor chip is less efficient and has extremely high chip costs.

(ii) If the range finder and the photometer are separately constituted, as in a range finder of FIG. 9A and a photometer of FIG. 9B, light shielding walls 501 to 505 are arranged between optical systems 303a, 303b and 303c and sensors 301a, 301b and 302c generally in a vertical direction from sensor surfaces such that light other than light made incident from the optical systems corresponding to the sensors is not made incident on the sensors.

When the range finding sensors 301a and 301b and the photometric sensor 302c are integrated into one chip, it is expected that external light made incident from the photometric lens 303c is made incident on the range finding sensor 301a and 301b or external light made incident from the range finding lenses 303a and 303b is made incident on the photometric sensor 302c. In such cases, the incidence of external light adversely affects range finding accuracy and photometry accuracy, respectively. Thus, U.S. Pat. No. 5,302,997 it is described that it is sufficient to provide appropriate preventive walls in order to cope with this problem. If this is materialized, light shielding walls 601 to 604 are constituted in a vertical direction from sensor surfaces 401a, 401b and 401c as shown in FIG. 10.

However, the above-mentioned conventional example does not describe a size of each sensor, and sizes of optical systems, a focal length and the like corresponding to each sensor. When these are taken into account, the light shielding walls cannot be arranged in the vertical direction with respect to the sensor surfaces.

SUMMARY OF THE INVENTION

The present invention has been devised in view of the above-mentioned drawbacks and therefore, it is an object of the present invention to provide a sensor device and an optical apparatus having the same that are preferable for a digital camera, a video camera, a film camera and the like, in which a range finding sensor, a photometric sensor and the like can be easily formed on an identical substrate (chip) while realizing miniaturization of the entire apparatus and which can perform range finding and photometry with high accuracy.

A sensor device according to the present invention includes: a substrate having formed thereon first and second line sensors that are arranged a fixed baseline length apart from each other and a third sensor for receiving light from a field which is arranged on a line in an arrangement direction of the first and second line sensors; a first light receiving optical unit for condensing light from the field onto the first line sensor; a second light receiving optical unit for condensing light from the field onto the second line sensor; and a third light receiving optical unit for condensing light from the field onto the third sensor, wherein, when focal lengths of said first, second, and third light receiving optical units are assumed to be f1, f2, and f3, respectively, the following condition is satisfied: $f1=f2 \geq f3$.

Further characteristics of the present invention will be apparent from accompanying drawings and descriptions of the present invention.

BRIEF DESCRIPTION OF THE DRAWINGS

FIGS. 9A and 9B are explanatory views of structures of a range finder and a photometer in the conventional example;

FIG. 10 is an explanatory view of a range finding and photometric integral sensor in the conventional example; and FIG. 11 is a schematic view of an optical apparatus of the present invention.

DESCRIPTION OF THE PREFERRED EMBODIMENTS

First Embodiment

FIGS. 1A, 1B, and 1C to FIGS. 4A and 4B are views for explaining a first embodiment of the present invention.

Note that it is assumed that, as a range finding method in this embodiment, a so-called image deviation system is used which finds a relative positional relationship between two object images based on object images on a predetermined surface photographed by an object lens to perform focus detection.

In an optical apparatus such as a camera, the optical apparatus can satisfy its function if a field of view to be subjected to range finding in a photographing screen (range finding field of view) is generally oblong with respect to the photographing screen. However, the field of view to be subjected to photometry (photometry field of view) is generally required to be a wide area including a central part of a photographing screen. This will be described with reference to FIGS. 1A, 1B, and 1C. These figures show an example of photographing in a photographing screen 1 by a camera. A main subject 2 who is in black in a bright background is photographed in a so-called back light state.

Figure 1A:
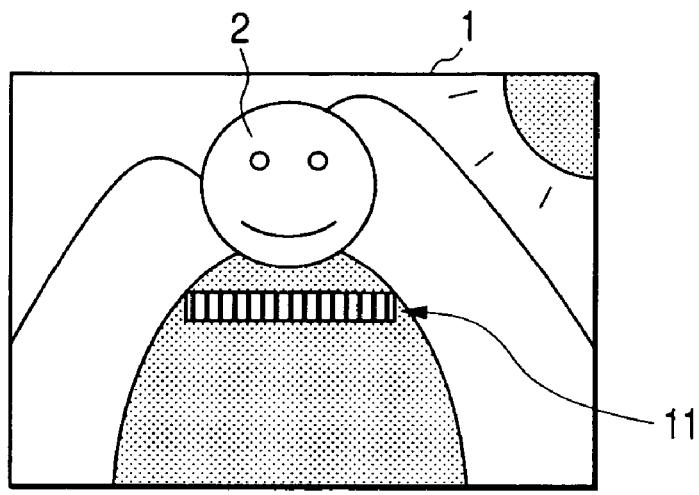
FIGS. 1A, 1B, and 1C are views of photographing screens of a camera for explaining an embodiment of the present invention.

In FIG. 1A, reference numeral 11 denotes an area corresponding to a range finding line sensor (sensor) on the photographing screen 1. The area is in a shape covering an area in which a distance to a person who is the main subject 2 can be measured.

Figure 1B:
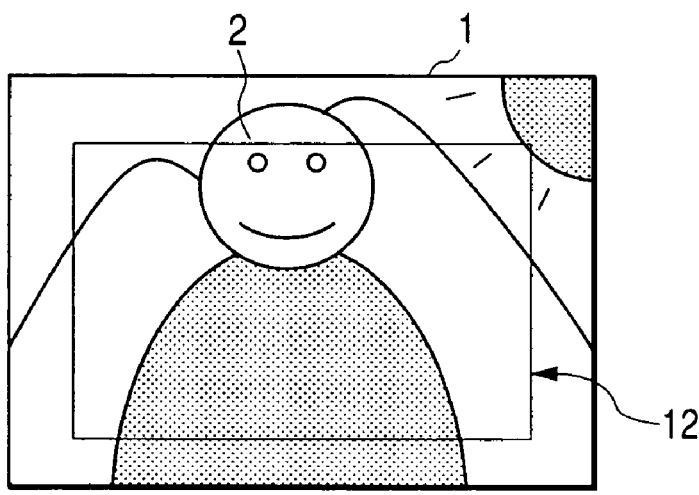

In addition, in FIG. 1B, reference numeral 12 denotes an area corresponding to a photometric area sensor (sensor) on the photographing screen. The area is in a shape covering an area larger than the area covered by the range finding line sensor 11, that is, an area including the person who is the main subject 2 as well as mountains in the background. Therefore, an output from the photometric area sensor 12 becomes an average output of luminance of the entire photographing screen 1. If exposure control of the camera is performed based on information of the average output, a photograph in an adequate exposure state over the entire screen can be photographed even in a back light scene as in FIG. 1B.

Figure 1C:
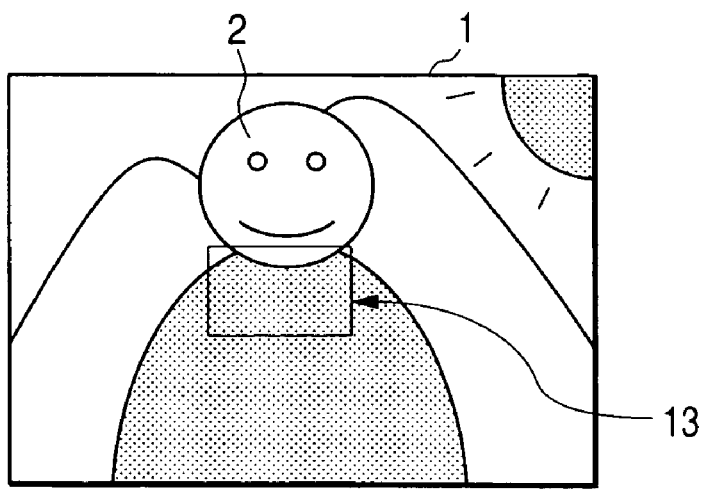

On the other hand, if an area of a photometric area sensor 13 is small with respect to the photographing screen 1 as shown in FIG. 1C and is in a shape covering only an area of a person 2, although adequate exposure can be obtained for the person 2, it is imagined that an exposure state of the background is not,adequate (in the example of FIGS. 1A to 1C, an exposure state of the person in the back light state who is the main subject 1 is assumed to be adequate, and the background is not taken at all, a so-called white void phenomenon). Thus, on the photographing screen 1, a range of the photometric area sensor 13 is desirably in a range equal to or larger than the range finding line sensor 11.

Here, a device realizing the above-mentioned contents is as described below.

Figure 2A:
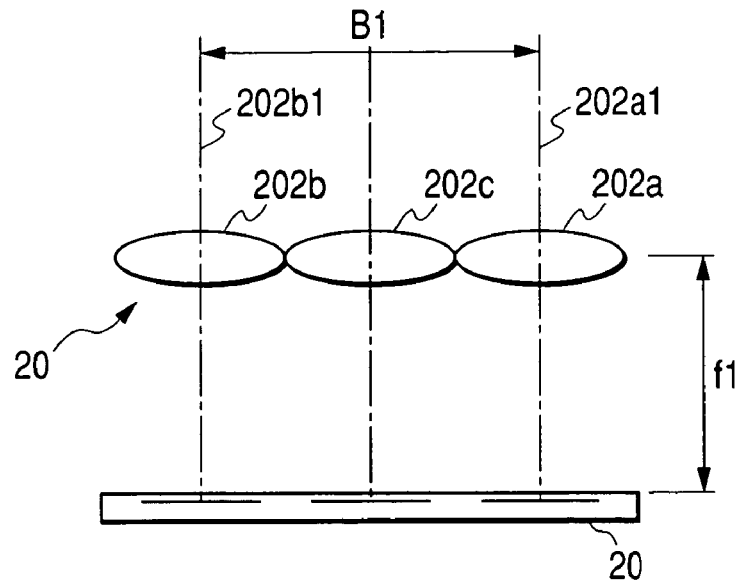
FIGS. 2A, 2B, and 2C are explanatory views of sensors and a sensor device for explaining a first embodiment of the present invention.
Figure 2B:
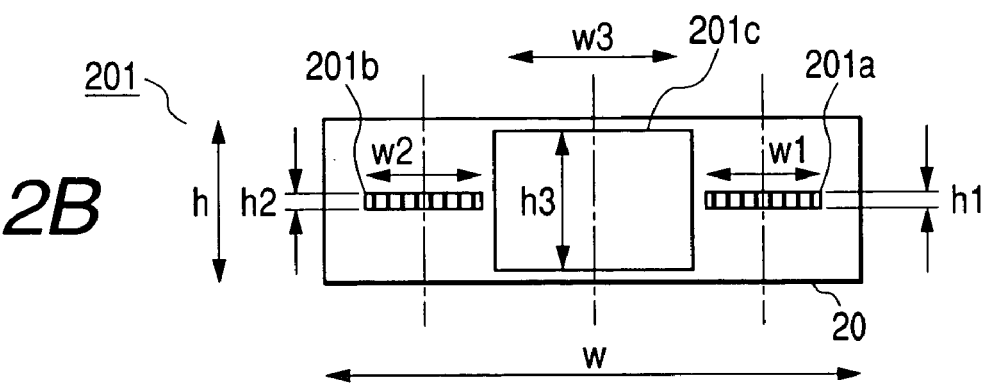

FIG. 2A is a view of a sensor chip 20 including a range finding sensor and a photometric sensor and a corresponding optical system 202 viewed from a direction perpendicular to an optical axis direction. FIG. 2B is a view of the sensor (sensor chip) 20 of FIG. 2A viewed from the optical system 202.

In FIGS. 2A and 2B, reference numeral 202 denotes a light receiving optical system for condensing light from a field, which has light receiving lenses for range finding (first and second light receiving optical systems) 202a and 202b and a light receiving lens for photometry (third light receiving optical system) 202c. Reference numeral 201 denotes a sensor, in which a pair of range finding line sensors (first and second line sensors) 201a and 201b and a photometric area sensor (third sensor) 201c and a circuit (not shown) for processing outputs from these sensors are integrated into one chip, and sizes of the chip are h in a vertical direction and w in a horizontal direction in FIG. 2B.

Further, focal lengths f1, f2, and f3 of the three light receiving lenses 202a, 202b, and 202c are the same, respectively. The range finding sensors 201a and 201b have sizes h1 and h2 in the vertical direction and sizes w1 and w2 in the horizontal direction in FIG. 2B, respectively, such that a sensor area as shown in FIGS. 1A and 1b is obtained on the photographing screen 1. In addition, the photometric sensor 201c has a size h3 in the vertical direction and a size w3 in the horizontal direction.

In this embodiment, for simplification of explanation, the following description is made assuming that w1 is equal to w2 and h1 is equal to h2.

In addition, an optical axis 202a1 of the light receiving lens for range finding 202a and an optical axis 202b1 of the light receiving lens 202b are arranged a baseline length B1 apart from each other. Similarly, a center of a size in horizontal direction of the range finding sensor 201a and a center of a size in horizontal direction of the range finding sensor 201b are arranged the same distance as the baseline length B1 apart from each other. The baseline length B1 depends on required measurement accuracy. In general, measurement accuracy is better when a focal length between a baseline length and a light receiving lens for range finding is longer.

Here, since the focal length f1, f2, and f3 of the three light receiving lens 202a, 202b, and 202c are equal, in order to make a photometric area larger than a range finding area on the photographing screen 1, a relationship among the sizes of the three light receiving sensors 201a, 201b, and 201c are set as follows:

h1<h3 w1<w3, provided, however, since the photometric sensor 201c is arranged between the pair of range finding sensors 201a and 201b, w3<(B1−w1).

In this embodiment, since the third sensor is arranged between the first and second line sensors as a structure of the sensor device, an influence of parallax is eliminated when the first to third sensors receive light from a field.

In addition, since sensors for measuring a distance to an object existing in a field are the first and second line sensors as a structure of the sensor device, it becomes possible to use the sensor device as a range finder. At the same time, the sensor device is allowed to measure a distance of an appropriate area of the field.

Further, since the third sensor is a sensor for measuring luminance of a field, it becomes possible to use the sensor device as a photometer. At the same time, the sensor device is allowed to measure light in an appropriate area in the field.

As is seen from the above description, the size in vertical direction h of the sensor constituted by the one chip 20 is substantially dominated by the size in vertical direction h3 of the photometric sensor 201c. Similarly, the size in horizontal direction w is substantially dominated by the baseline length B1 and the sizes in horizontal (baseline length) direction w1 and w2 of the range finding sensors 201a and 201b.

In short, since factors for dominating a chip size reside in the sensors of two types, the range finding sensors 201a and 201b and the photometric sensor 201c, the entire chip size can be reduced by approximating a size of the sensor of one type to a size of the sensor of the other type.

Figure 2C:
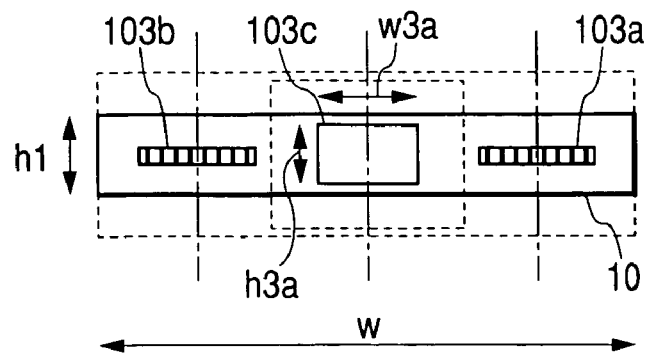

FIG. 2C shows a sensor chip. 10 with a reduced size compared with that in FIG. 2B. In FIG. 2C, a size in vertical direction of the photometric sensor 103c is set to be h3a (h3a<h3), and the size in vertical direction of the photometric sensor 103c is approximated to that of the range finding sensors 103a and 103b, whereby the size in vertical direction of the sensor chip 10 is set to h1 (h1<h). In this case, a size in horizontal direction w3a (w3a<w3) of the photometric sensor 103c is reduced with the same ratio as in reducing the size in vertical direction. When focal lengths of light receiving lenses corresponding to the sensors of the range finding sensors 103a and 103b and the photometric sensor 103c are equal, since the areas of the range finding sensors 103a and 103b on the photographing screen 1 are as shown in FIG. 1A, there is no specific problem. However, the area of the photometric sensor 103c on the photographing screen 1 may be reduced as shown in FIG. 1C.

Figure 3A:
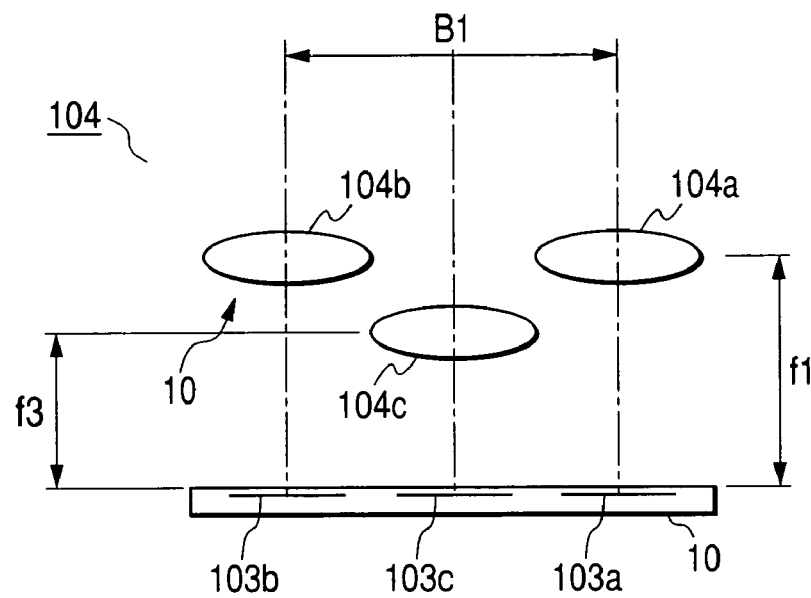
FIGS. 3A and 3B are explanatory views of the sensors and the sensor device in the first embodiment of the present invention.

Thus, in this embodiment, the focal length f3 of the light receiving lens for photometry 104c is set as follows as shown in FIG. 3A to solve the above-mentioned problem:

$$f3 \leq f1 \quad (1),$$

provided, however, $$f1=f2 \quad (2).$$

That is, in this embodiment, the focal lengths f1, f2, and f3 are set as follows:

$$f1=f2 \geq f3,$$

whereby a size of a sensor chip can be reduced remarkably. Thus, an inexpensive sensor device is made. To explain this more in detail, the focal length f3 of the light receiving lens for photometry 104c is reduced at the same ratio as in reducing the size of the photometric sensor 103c. That is, the focal length f3 is set so as to satisfy the following condition:

$$(wa3/w3)=(f3/f1),$$

whereby an area of a photometric sensor on a photographing screen equivalent to that in FIG. 1B is secured.

Figure 3B:
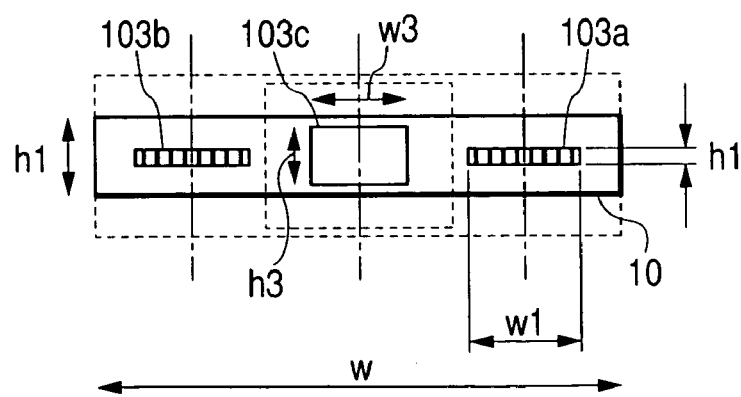

FIG. 3B shows the same view as FIG. 2C. As is seen from the sensor chip 10 in the figure, the dead spaces above and blow the range finding sensors 103c and 103b are extremely reduced, thereby realizing an effective sensor arrangement.

In other words, when it is assumed that a dimension in vertical direction of the range finding sensors 103a and 103b is h1, a dimension in horizontal direction of the range finding sensors 103a and 103b is w1, a dimension in vertical direction of the photometric sensor 103c is h3 and a dimension in horizontal direction of the photometric sensor 103c is w3, and a focal length of the light receiving lens for range finding 104a is f1 and a focal length of the light receiving lens for photometry is f3, in order to set an area of the photometric sensor 103c larger than or equal to an area of the range finding sensors 103a and 103b on the photographing screen 1, a condition is as follows in the vertical direction of the photographing screen 1:

$$(f3/f1) \leq (h3/h1) \quad (4),$$

provided, however, f1=f2.

Since the area of the photometric sensor 103c can be set equal to or larger than the area of the range finding sensors 103a and 103b on the photographing screen 1 by satisfying Expression (4) when the device is mounted on a camera or the like, it becomes possible to control the camera or the like such that a high quality image that is in focus with adequate exposure can be obtained.

In the horizontal direction of the photographing screen 1, it is sufficient that the following condition is satisfied:

$$(f3/f1) \leq (w3/w1) \quad (3),$$

provided, however, f1=f2.

Since the area of the photometric sensor 103c can be set equal to or larger than the area of the range finding sensors 103a and 103b on the photographing screen 1 by satisfying Expression (3) when the device is mounted on a camera or the like, it becomes possible to control the camera or the like such that a high quality image that is in focus with adequate exposure can be obtained.

To explain Expressions (3) and (4) more in detail, when it is assumed that a size of each sensor is equal as follows:

$$h1=h3 \quad (5)$$

$$w1=w3 \quad (6),$$

in order to set the area of the photometric sensor 103c equal to or larger than the area of the range finding sensors 103a and 103b on the photographing screen 1, it is sufficient to set the focal lengths f1 and f3 as follows:

$$f3 \leq f1 \quad (7).$$

It is seen that satisfying, in particular, Expression (7) among the above-mentioned Expressions (3) to (7) contributes significantly to reducing a size of a sensor chip.

Figure 4A:
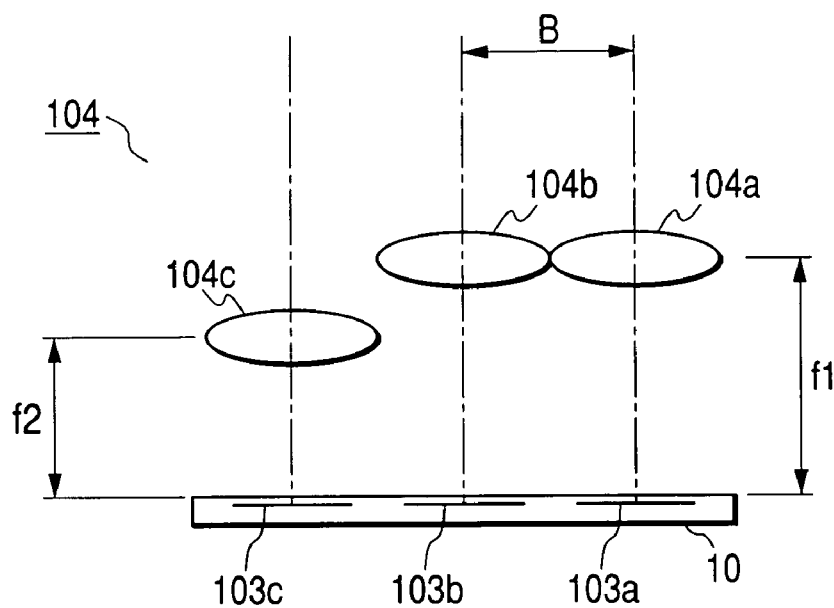
FIGS. 4A and 4B are explanatory views of sensors and a sensor device in a modification of the first embodiment of the present invention.
Figure 4B:
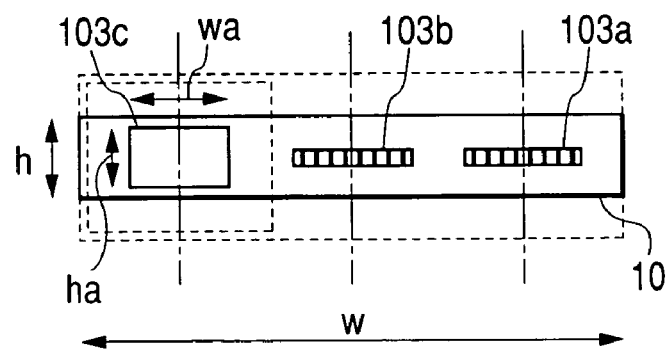

In addition, in this embodiment, a relationship among the above-mentioned Expressions (3) to (7) can be applied not only to a structure in which the photometric sensor 103c is arranged between the pair of range finding sensors 103a and 103b but also to a case in which the photometric sensor 103c is arranged on the outside of the pair of range finding sensors 103a and 103b as shown in FIGS. 4A and 4B.

Moreover, the contrivance in the case in which the range finding sensors and the photometric sensor are integrated is described in the above-mentioned example. However, for example, even if it is considered to replace the photometric sensor in the above-mentioned example with a sensor for remote control reception and integrate the range finding sensors with the sensor for remote control reception, it is expected that the same problem will occur because the sensor for remote control reception is required to receive signal light from a wider field of view compared with the range finding sensor.

Thus, in this embodiment, the third sensor is changed to a sensor for receiving a remote control signal from the outside as a structure of the sensor device, whereby it becomes possible to use the sensor device as a remote controlled light receiving device. At the same time, the sensor device is allowed to receive a remote control signal from an appropriate area of a field.

That is, in the case in which the same problem is expected, it is desirable to apply the relationship of the above-mentioned Expressions (3) to (7).

In addition, the optical system 202 constituted by the light receiving lenses 202a, 202b, and 202c shown in FIG. 2A, the optical system 104 constituted by the light receiving lenses 104a, 104b, and 104c shown in FIG. 3A, and the optical system 104 constituted by three light receiving lenses shown in FIG. 4A may be constituted as an integrally molded three-eye lens, respectively.

Further, although one area sensor is assumed as the above-mentioned photometric sensor, a multi-segmented sensor as disclosed in U.S. Pat. No. 5,302,997 may be used as the photometric sensor.

Second Embodiment

Next, a second embodiment of the present invention will be described.

In FIGS. 3A and 3B, the range finder and photometer is illustrated in which the size of the photometric sensor 103c is reduced and the focal length f3 of the light receiving lens for photometry 104c is made shorter than the focal length f1 of the light receiving lenses for range finding 104a and 104b, whereby the chip size of the sensor is reduced.

Here, when a focal length is reduced while keeping an opening area of a light receiving lens constant, an F number (focal length of a lens/diameter of a lens opening) indicating brightness of a lens decreases. However, it is generally difficult to manufacture a lens with an F number of 1 or less. Therefore, if a focal length of a lens is reduced significantly, a diameter of a lens opening is required to be reduced such that the F number becomes larger than one.

On the other hand, the smaller an F number of a light receiving lens (the brighter a lens), with a better S/N ratio a range finder and a photometer can be provided. Thus, a space created by reducing the focal length f3 and the opening diameter of the light receiving lens for photometry can be utilized to increase the opening diameter of the light receiving lens for photometry within a range in which the F number is larger than one.

Figure 5A:
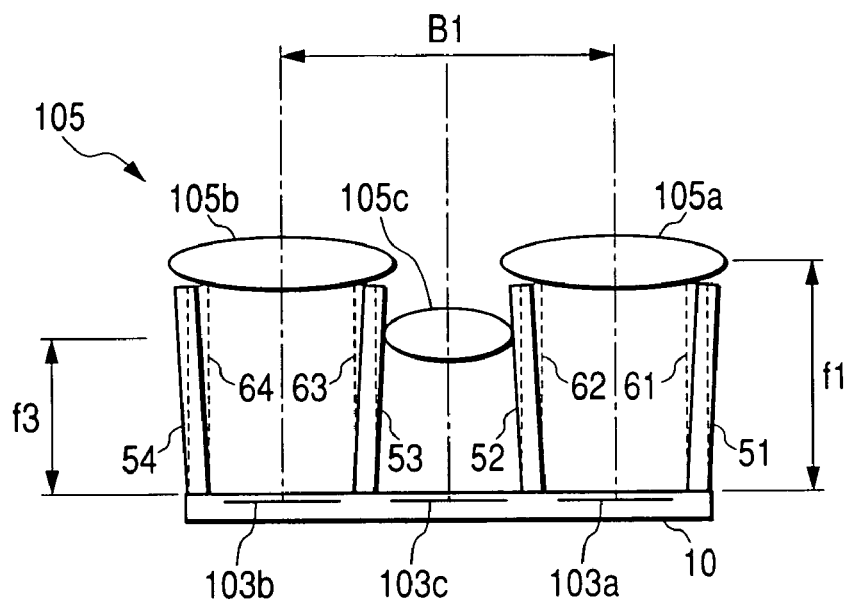
FIGS. 5A and 5B are explanatory views of sensors and a sensor device in a second embodiment of the present invention.
Figure 5B:
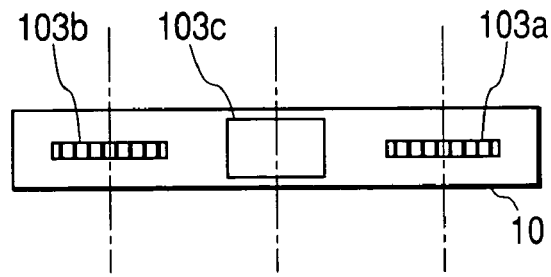

FIGS. 5A and 5B are explanatory views illustrating the above description.

A structure of the sensor chip 10 in FIGS. 5A and 5B is identical with that described in FIGS. 3A and 3B. In FIG. 5A, reference numeral 105 denotes a light receiving optical system for condensing light from a field, which has light receiving lenses for range finding 105a and 105b and a light receiving lens for photometry 105c.

Focal lengths f1 and f2 of the light receiving lenses for range finding 105a and 105b are set to the same focal length f1 with which the light receiving sensors for range finding 103a and 103b in FIG. 5B have the sensor area as shown in FIG. 1A on the photographing screen. In addition, a focal length of the light receiving lens for photometry 105c is set to a focal length f3 with which the light receiving sensor for photometry 103c in FIG. 5B has the sensor area as shown in FIG. 1B on the photographing screen. At the same time, an opening diameter of the light receiving sensor for photometry 103c is reduced such that an F number becomes larger than one.

On the other hand, in the light receiving lenses for range finding 105a and 105b, in order to increase an S/N ratio of a range finding signal, an opening diameter is increased within a range in which an F number does not become equal to or smaller than one and to a degree in which the light receiving lenses for range finding 105a and 105b do not overlap the light receiving lens for photometry 105c.

Moreover, FIG. 5A shows light shielding walls that are required when the sensors and the lenses are incorporated in a device. Reference numerals 61 to 64 shown by broken lines show the case in which the light shielding walls are constituted in a vertical direction from a sensor surface just like the light shielding walls 601 to 604 shown in FIG. 10.

In FIG. 5A, the light shielding wall 61 extends vertically toward the light receiving lens for range finding 105a from a left outer side viewed from an object side of the range finding sensor 103a (this is the same in the following description). The light shielding wall 62 extends vertically toward the light receiving lens for range finding 105a in a manner to avoid the light receiving lens for photometry 105c from a part between the range finding sensor 103a and the photometric sensor 103c. The light shielding wall 63 extends vertically toward the light receiving lens for range finding 105b in a manner to avoid the light receiving lens for photometry 105c from a part between the range finding sensor 103b and the photometric sensor 103c. The light shielding wall 64 extends vertically toward the light receiving lens for range finding 105b from a right outer side of the range finding sensor 103b.

As is seen from FIG. 5A, the light shielding walls 61 to 64 do not become obstacles for light made incident from the light receiving lens for photometry 105c but become obstacles for light made incident from the light receiving lenses for range finding 105a and 105b. That is, although the opening diameter of the light receiving lenses for range finding 105a and 105b are increased in order to obtain a high S/N ratio of a range finding signal, the increase in the opening diameter does not lead to an increase in the S/N ratio because incident light is shielded by the light shielding walls 61 to 64.

In FIG. 5A, reference numerals 51 to 54 denote light shielding walls in this embodiment.

In FIG. 5A, the light shielding wall 51 extends obliquely toward a left outer side of the light receiving lens for range finding 105a from a left outer side of the range finding sensor 103a. The light shielding wall 52 extends in a manner to avoid the light receiving lens for photometry 105c and obliquely toward a right outer side of the light receiving lens for range finding 105a from a part between the range finding sensor 103a and the photometric sensor 103c. The light shielding wall 53 extends in a manner to avoid the light receiving lens for photometry 105c and obliquely toward a left outer side of the light receiving lens for range finding 105b from a part between the range finding sensor 103b and the photometric sensor 103c. The light shielding wall 54 extends obliquely toward a right outer side of the light receiving lens for range finding 105b from a right outer side of the range finding sensor 103b.

In this way, the light shielding walls 51 to 54 do not become obstacles for light made incident from the light receiving lens for photometry 105c as a matter of course and then, the light shielding walls 51 to 54 can be constituted such that it is less likely for the light shielding walls 51 to 54 to become obstacles for light made incident from the light receiving lenses for range finding 105a and 105b. Thus, it is possible to secure an S/N ratio of a range finding signal sufficiently.

Here, the light shielding wall 51 may be extended in a vertical direction with respect to the sensor surface from the left outer side of the light receiving lens for range finding 105a and the light shielding wall 54 may be extended in a vertical direction with respect to the sensor surface from the right outer side of the light receiving lens for range finding 105b only from the viewpoint of the S/N ratio of a range finding signal. However, a structure from the range finding sensor 103a to the light receiving lens 105a is required to be symmetrical with respect to a line from the center of the range finding sensor 103a to the center of the light receiving lens 105a. If the structure from the range finding sensor 103a to the light receiving lens 105a should be asymmetrical, assuming that external light other than light from an object of measurement is reflected on the light shielding walls, an influence of the reflection is not equal in the right and left parts on the sensor. This results in a range finding error. Therefore, the structure from the range finding sensor 103a to the light receiving lens 105a is required to be symmetrical.

That is, in a structure of a range finder and photometer having the optical system as shown in FIGS. 5A and 5B, light shielding walls for shielding an optical path for range finding from other optical paths are formed so as to be extended in a direction in which a distance between the light shielding walls widens toward the range finding lenses 105a and 105b from the range finding sensors 103a and 103b, whereby the structure of the light shielding walls 51 to 54 can be made symmetrical, and it becomes possible to secure a sufficient S/N and alleviate a measurement error (wrong range finding).

Figure 6A:
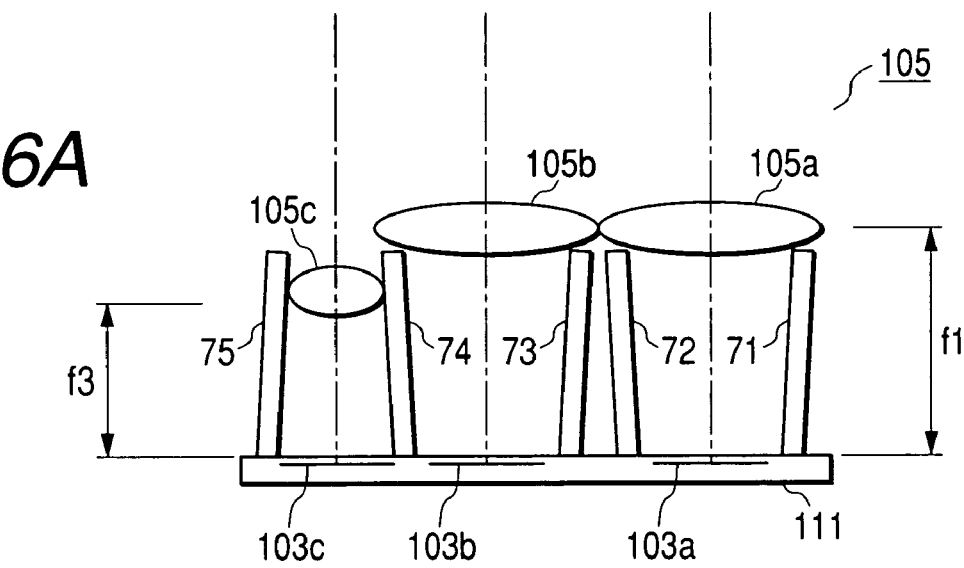
FIGS. 6A and 6B are explanatory views of sensors and a sensor device in a modification of the second embodiment of the present invention.
Figure 6B:
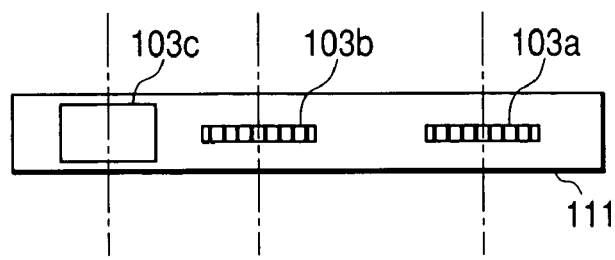
Figure 7A:
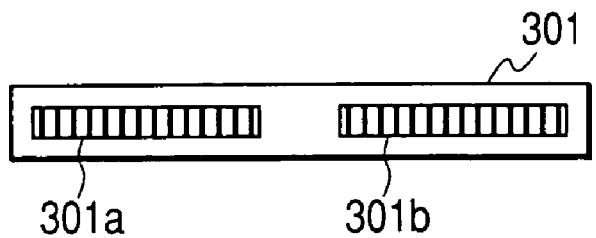
FIGS. 7A and 7B are explanatory views of a range finding sensor and a photometric sensor in a conventional example.
Figure 7B:
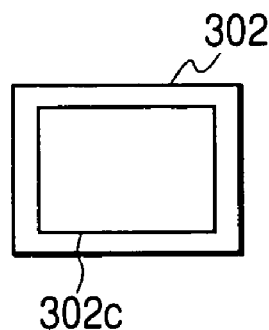
Figure 8:
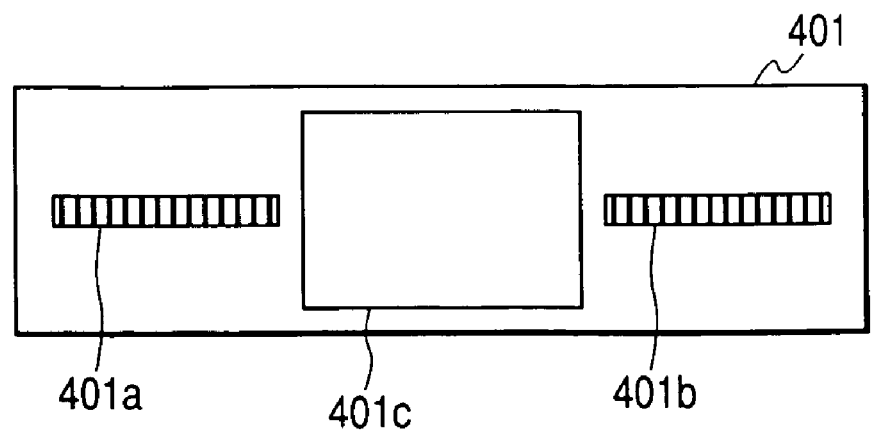
FIG. 8 is an explanatory view of a range finding and photometric integral sensor in the conventional example.

In addition, it is desirable to apply the structure of the light shielding walls 51 to 54 not only to the structure in which the photometric sensor 103c is arranged between the pair of range finding sensors 103a and 103b but also to a case in which a sensor chip 111 is used on which the photometric sensor 103c is arranged on the outside of the pair of range finding sensors 103a and 103b as shown in FIGS. 6A and 6B.

In FIG. 6A, reference numerals 71 to 75 denote light shielding walls.

In addition, as long as the above-mentioned structure of the optical system is adopted, it is desirable to apply the above-mentioned structure of the light shielding walls even if other sensors are used as the photometric sensor 103c and the range finding sensors 103a and 103b.

In addition, the optical system 105 constituted by the light receiving lenses 105a, 105b, and 105c shown in FIG. 5A and an optical system 105 constituted by three light receiving lenses 105a, 105b and 105c shown in FIG. 6A may be constituted as an integrally molded three-eye lens, respectively.

Note that, although sensor chips 103, 110, 111, 201, 301, 302, and 401 are generally arranged in a predetermined package such that the sensor chips are easily incorporated in a device, illustration of the package is omitted in each embodiment for simplification of descriptions.

In addition, although one area sensor is assumed as the above-mentioned photometric sensor, a multi-segmented sensor as disclosed in U.S. Pat. No. 5,302,997 may be used as the photometric sensor.

Next, an embodiment of a single-lens reflex camera (optical apparatus) having the sensor device of the present invention will be described with reference to FIG. 11.

In FIG. 11, reference numeral 40 denotes a camera main body; 41, a photographing lens; and 42, photographing means, which consists of a film, a CCD or the like. Reference numeral 43 denotes a finder system, which has a focusing glass 45 on which a subject image is formed, a pentagonal prism 46 as image reversing means, and an ocular lens 47 for observing a subject image on the focusing glass 45. Reference numeral 44 denotes a quick return mirror. Reference numeral 48 denotes a sub-mirror and 49 denotes a sensor device in accordance with the present invention.

Light from a subject passes through the photographing lens 41. Then, the light passes through a light transmitting portion (half mirror surface) of the quick return mirror 44 and is reflected on the sub-mirror 48 to be made incident on the sensor device 49. Range finding and photometry are performed by the sensor device 49.

As described above, the sensor device of the present invention is applied to electronic cameras such as a video camera and a digital still camera and a film camera, whereby an optical apparatus having high optical performance is realized.

According to the present invention, a sensor device preferable for a digital camera, a video camera, a film camera and the like and an optical apparatus having the same can be realized, in which a range finding sensor, a photometric sensor and the like can be easily formed on an identical substrate (chip) while realizing miniaturization of the entire apparatus and which can perform range finding and photometry with high accuracy.

According to the present invention, a range finding sensor, a photometric sensor and the like are appropriately formed on an identical substrate (chip) and, moreover, an optical system for guiding light to the sensors is appropriately set, whereby a high accurate sensor device and an optical apparatus having the same can be realized.

The invention claimed is:

1. A sensor device comprising:
   a first and a second sensors arranged at an interval of predetermined baseline length so as to take a correlation between output signals therefrom;
   a third sensor for receiving light from a field, wherein the third sensor is arranged on a surface on which the first and the second sensors are arranged;
   a first optical unit for relating light from a field to the first sensor;
   a second optical unit for relating light from a field to the second sensor; and
   a third optical unit for relating light from a field to the third sensor;
   wherein focal lengths of the first and the second optical units are different from that of the third optical unit; and
   wherein the third sensor is a sensor measuring a brightness in order to control exposure.

2. A sensor device according to claim 1,
   wherein the third sensor is disposed between the first sensor and the second sensor.

3. A sensor device according to claim 1,
   wherein the first and the second sensors are line sensors.

4. A sensor device according to claim 1,
   wherein the first and the second sensors are sensors for measuring a distance to a subject.

* * * * *